July 3, 1951 L. W. STAHL ET AL 2,558,990
ROTARY HYDRAULIC SWIVEL
Filed June 23, 1947 2 Sheets-Sheet 1

Inventor
Leslie W Stahl &
Harry E Young, Jr.
By Fred Gerlach Atty

July 3, 1951  L. W. STAHL ET AL  2,558,990
ROTARY HYDRAULIC SWIVEL
Filed June 23, 1947  2 Sheets-Sheet 2
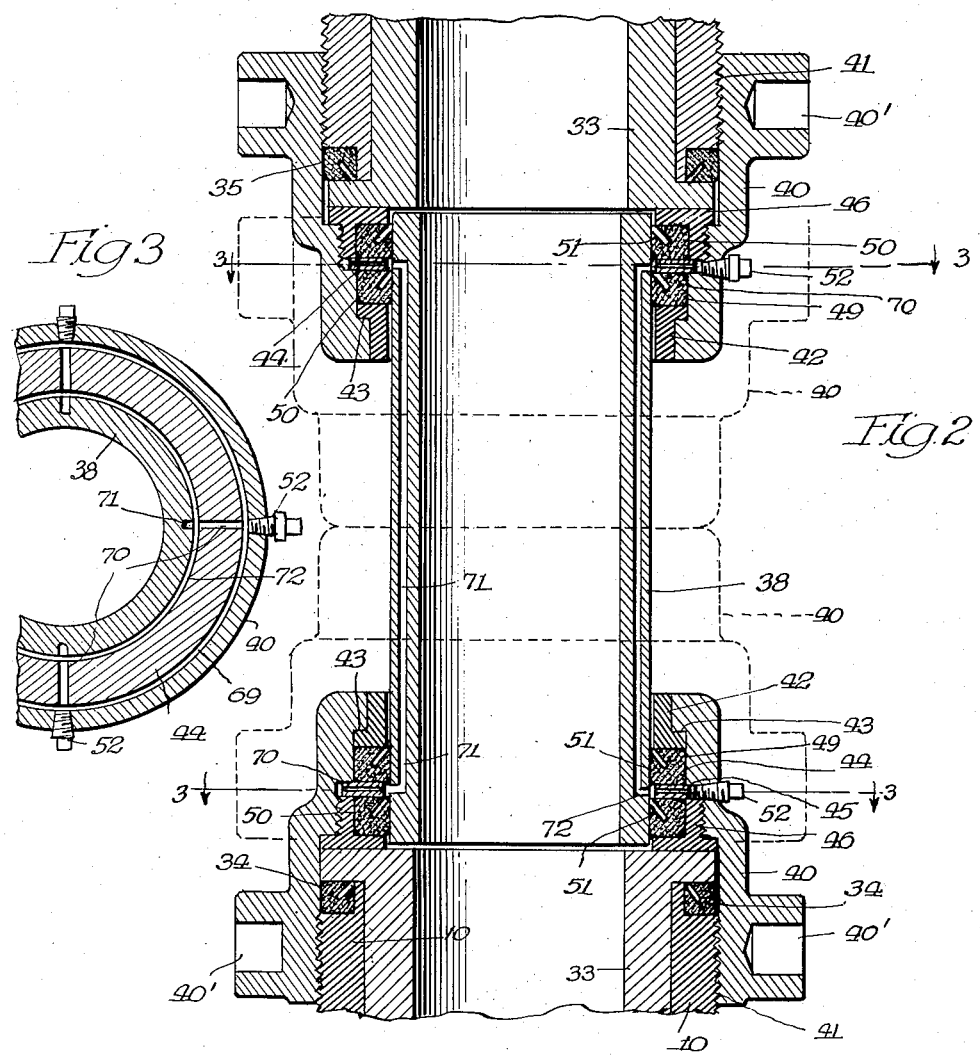
Inventor
Leslie W Stahl &
Harry E Young, Jr.
By Fred Gerlach Atty Patented July 3, 1951

2,558,990

UNITED STATES PATENT OFFICE 2,558,990

ROTARY HYDRAULIC SWIVEL

Leslie W. Stahl, Houston, Tex., and Harry E. Young, Jr., Atchison, Kans., assignors to The Locomotive Finished Material Company, Atchison, Kans., a corporation of Kansas Application June 23, 1947, Serial No. 756,378

8 Claims. (Cl. 285—9)

1

The invention relates to rotary hydraulic swivels, more particularly of the type used in well drilling operations.

One object of the invention is to provide an improved rotary hydraulic swivel which includes rotatable and non-rotatable fluid conducting elements communicatively connected by a floating tube or pipe section which is not rigidly attached to either of the elements, and demountable packing assemblies with sealing means between both ends of the tube and said elements.

Another object of the invention is to provide a hydraulic swivel which comprises rotatable and non-rotatable elements and a tube communicatively connected to the elements, and unitary packing assemblies at the ends of the tube which are readily demountable with the tube for unitary lateral withdrawal from the space between the elements.

Another object of the invention is to provide a hydraulic swivel of this type in which the floating tube is carried in the packing devices and is free for self-positioning between axially misaligned non-rotatable and rotatable elements.

Another object of the invention is to provide a hydraulic swivel of this type, with demountable packing devices which contain sealing rings and means for lubricating them.

Another object of the invention is to provide a hydraulic swivel of this type, in which the tube and packing devices are reversible end-to-end between the non-rotatable and rotatable elements.

Other objects of the invention will appear from the detailed description.

The invention consists in the several novel features hereinafter set forth, and more particularly defined by claims at the conclusion hereof.

In the drawings:

Fig. 2 is a section upon a larger scale, of the ends of non-rotating and rotating elements of the swivel, the tube communicatively connecting them, and the packing devices for providing fluid-tight seals between said elements and the tube.

Fig. 3 is a section taken on line 3—3 of Fig. 2.

Fig. 4 is a section illustrating a modification of the invention.

Figure 1:
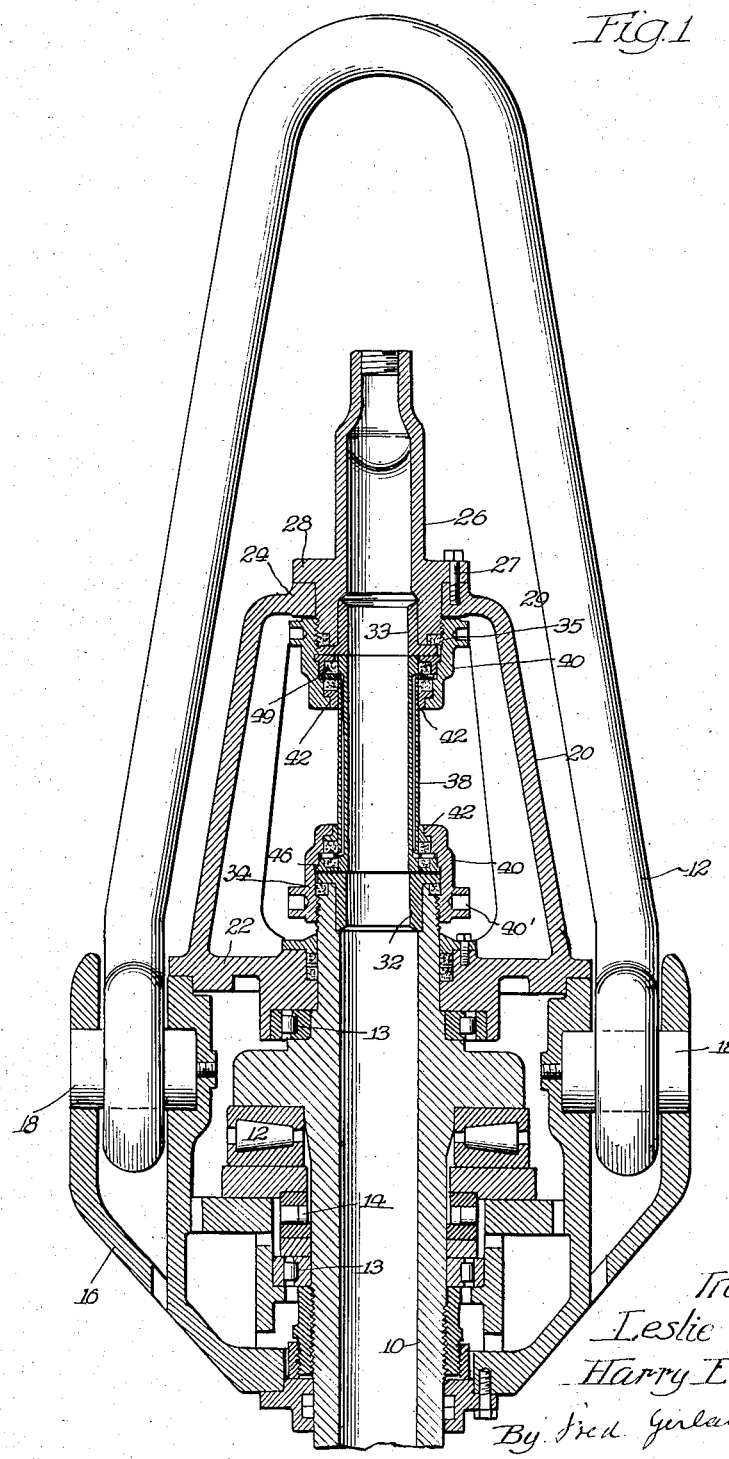
Fig. 1 is a vertical section of a rotary hydraulic swivel, exemplifying the invention.

The invention is exemplified in a hydraulic swivel which comprises a rotatable tubular stem 10 which is usually driven by a rotary table and connected to the upper end of a pipe which con-

2 ducts wash fluid to a drilling tool at its lower end, as well understood in the art. The upper end of stem 10 extends through a casing 16 which is supported by a bail 12 which is connected to trunnions 18 which are mounted in said casing. Bail 12 is usually supported by a cable hoist for raising and lowering the swivel. Rotatable stem 10 is journalled in a main thrust bearing 12, radial bearings 13, and an upthrust bearing 14 of the anti-friction type, for rotation in casing 16. A bonnet 20 includes a head 22 which forms a closure for the top of casing 16. The bonnet 20 includes an annulus 24 at its upper end. A gooseneck 26 has an annular flange 28 which is secured by bolts 27, to the top of bonnet 20 and is supported from casing 16 by said bonnet. Fluid for delivery to the drill pipe, is conducted to the offset portion of the gooseneck by the usual flexible pipe (not shown) for delivering wash fluid through the gooseneck to stem 10 and the drill pipe. The gooseneck exemplifies a non-rotatable element of the swivel, and the stem 10 a rotatable element thereof. A replaceable bushing 32 is secured in the upper end of stem 10 and a similar bushing 33 is secured in the lower end of gooseneck 26.

The lower end of gooseneck 26 which extends through annulus 24 of bonnet 20, and the upper end of the rotatable stem, are spaced apart vertically and are communicatively connected for the flow of wash fluid from the gooseneck into the bore of stem 10 by a demountable tube or pipe section 38. Demountable unitary packing assemblies or devices which include sealing rings, are provided between the upper and lower ends of tube 38 and gooseneck 26 and stem 10, respectively, for preventing escape of fluid. Tube 38 is floatingly held between gooseneck 26 and stem 10 and is free to rotate with the rotatable packing device on the lower end of tube 38 which is connected to stem 10, or to permit the tube to remain stationary with the packing device on the nonrotatable gooseneck 26. This tube 38 exemplifies a fluid conducting element which is rotatable relatively to the gooseneck 26, or relatively to stem 10. In this construction, the wear is distributed between the contacting surfaces of the sealing rings which are of flexible and absorbent material, and said tube. This construction also supports the tube so it is free to position itself to compensate for any axial misalignment of the elements and the tube while maintaining the fluid seals. The two demountable packing devices containing the sealing rings, may be unitarily removed laterally with tube 38 and independently of the gooseneck and stem 10. The packing devices are provided with means for introducing lubricant between the contact surfaces of the tube and the sealing rings, for lubricating said contact surfaces. These packing devices are alike in construction, so that they may be interchangeably and demountably attached to the non-rotatable gooseneck 26 and the stem 10. These packing devices, when detached from the gooseneck 26 and stem 10, respectively, are slidable together on the tube 38, so that the tube and packing devices may be unitarily removed laterally from between the gooseneck and stem. For this purpose, the overall height of the packing devices when moved together on tube 38, is less than the space between gooseneck 26 and stem 10.

Each packing device consists of a unitary assembly which comprises a collar 40 which is provided with a screw thread 41 whereby it may be demountably attached to the lower end of gooseneck 26 or to the stem 10, which are provided with corresponding screw threads. Each collar 40 is provided with sockets $40^1$ which are adapted to receive a bar for rotating the collar onto or off the fluid conducting elements. A replaceable bushing 42 which is angular in cross-section, is seated against an annular shoulder 43 in the posterior end of each collar. An oil distributing ring 44 is seated against an internal shoulder 45 in collar 40, and is secured against said shoulder by a gland 46 which is screw-threaded into collar 40. A sealing ring of flexible and resilient packing material, 49, is confined between ring 44 and bushing 42, and a similar sealing ring 50 is confined between ring 44 and gland 46. Bushings 42 and 46 are bored to leave clearance around tube 38, so that the sealing rings 49 and 50 will form the contacting surfaces between tube 38 and the packing devices. As a result, tube 38 will contact adjacent its ends, mainly with the inner periphery of sealing rings 49 and 50 so that the tube may remain stationary with the gooseneck 26 or rotate with stem 10, and so that the wear will be distributed to the contact surfaces between tube 38 and the sealing rings in both packing devices, and the tube will be free to position itself in the sealing rings and compensate for axial misalignment of gooseneck 26 and stem 10 while maintaining the fluid seals. A ring 34 of resilient packing between bushing 33 and stem 10, forms a seal between stem 10 and the collar 40 of the lower packing device. A ring 35 of resilient packing between bushing 32 and gooseneck 26, forms a seal between said gooseneck and the collar 40 of the upper packing device.

In the operation of these hydraulic swivels which include a floating tube, it is advantageous to keep the sealing rings well lubricated for preventing wear. A series of suitable fittings 52 are screw-threaded into each collar 40, for introducing lubricant for the sealing rings 49 and 50, into an annular space 69 in collar 40 around ring 44. Radial ports 70 extend through each oil ring 44 and conduct lubricant to a channel 72 around tube 38. Axial ports 71 in tube 38 have their ends communicatively connected to channels 72 in the upper and lower packing devices. From each channel 72 lubricant flows to the associated sealing rings 49 and 50. Each ring 49 and 50 is provided with an annular groove 51 which provides pressure sealing lips when fluid or lubricant is introduced under pressure.

During a drilling operation, the wash fluid delivered into gooseneck 26 will flow through tube 38 into the rotatable stem 10 and to the drill pipe. The packing devices prevent the escape of fluid at the junctures of tube 38 with gooseneck 26 and stem 10. Tube 38, the ends of which contact with the lubricated rings 49 and 50 in the packing device on the non-rotatable gooseneck, and the lubricated rings 49 and 50 in the packing device which rotates with stem 10, will be floating or free to remain stationary with gooseneck 26, or rotate with stem 10, or rotatably slip relatively to both packing devices. This distributes the wear on the contact surfaces between tube 38 and the sealing rings, and tube 38 is free to position itself within the sealing rings to compensate for axial misalignment of the gooseneck 26 and stem 10 while maintaining the fluid seals. When for any purpose it is desired to remove tube 38 for repair or replacement of the packing devices, or the sealing rings, it is only necessary to unscrew collars 40 from gooseneck 26 and from stem 10 and move the packing devices together, as illustrated in dotted lines in Fig. 2. Tube 38 and the packing devices can then be unitarily removed laterally from the space between gooseneck 26 and stem 10. This may be done while the gooseneck remains secured to bonnet 20, and stem 10 remains journalled in casing 16, and greatly facilitates the removal and replacement of tube 38 and the packing assemblies. When the tube and packing assemblies have been thus removed, the packing assemblies may be readily slipped off the ends of the tube, for repair or replacement of their parts. In replacing the tube and packing devices, the assembled tube 38 and the packing devices may be laterally inserted between gooseneck 26 and stem 10, and the coupling collars 40 may be readily secured in operative position. The packing devices and tube are endwise reversible for interchangeably securing the packing devices to the gooseneck 26 and stem 10.

The invention exemplifies a hydraulic swivel for drilling operations which includes a floating tube between the non-rotatable and rotatable fluid conducting elements and self-contained packing assemblies including lubricated sealing rings which are readily demountable with the tube, without disturbing the connections between the gooseneck and its supporting bonnet; which provides for distribution of wear on the contacting areas of the tube and the sealing ring; which does not require accurate axial alignment of the non-rotatable and rotatable fluid conducing elements for maintaining the fluid seals; and which is simple in construction and efficient in operation.

The invention is not to be understood as limited to the details described, since these may be modified within the scope of the appended claims without departing from the spirit or scope of the invention.

Having thus described the invention, what we claim as new and desire to secure by Letters Patent is:

1. A hydraulic rotary swivel, comprising: non-rotatable and rotatable fluid conducting elements; a floating tube for conducting fluid and interposed between said elements and separable therefrom and demountable packing-assemblies around the ends of the tube, respectively; each assembly including sealing means around the tube and a member provided with means for detachably attaching the assembly of which it is a part, to one of said elements, the sealing means of each assembly having contact with the tube which leaves it free to rotate or remain stationary during operation of the swivel, said members being movable toward each other on the tube when they are uncoupled from said element.

2. A hydraulic rotary swivel, comprising: non-rotatable and rotatable fluid conducting elements; a floating tube for conducting fluid and interposed between said elements and separable therefrom and demountable packing-assemblies around the ends of the tube, respectively; each assembly including sealing means around the tube and a collar provided with a screw-thread for detachably attaching the assembly of which it is a part, to one of said elements, the sealing means of each assembly having contact with the tube which leaves it free to rotate or remain stationary during operation of the swivel, said collars being movable toward each other when they are uncoupled from said elements.

3. A hydraulic rotary swivel, comprising: non-rotatable and rotatable fluid conducting elements; a floating tube for conducting fluid and interposed between said elements and separable therefrom and demountable packing-assemblies around the ends of the tube, respectively; each assembly including a sealing ring around the tube, a collar provided with means for detachably attaching the assembly of which it is a part, to one of said elements, and a gland in the collar, the sealing means of each assembly having contact with the tube which leaves it free to rotate or remain stationary during operation of the swivel, said collars being movable toward each other along the tube when they are uncoupled from said elements.

4. A hydraulic rotary swivel comprising: non-rotatable and rotatable fluid conducting elements; a floating tube for conducting fluid and interposed between said elements and separable therefrom and demountable packing-assemblies around the ends of the tube, respectively; each assembly including a plurality of sealing rings around the tube, a collar around said rings, provided with means for detachably attaching the assembly of which it is a part, to one of said elements, a bushing in the collar, and a gland in the collar for said rings, the sealing rings of each assembly having contact with the tube which leaves it free to rotate or remain stationary during operation of the swivel.

5. A hydraulic rotary swivel comprising: non-rotatable and rotatable fluid conducting elements; a tube for conducting fluid and interposed between said elements and separable therefrom; and packing-assemblies adjacent the ends of the tube, respectively, each assembly including annular packing means contacting the tube and a member provided with means for demountably attaching the assembly of which it is a part, to one of said elements, said members being movable toward each other longitudinally of the tube to clear the elements for unitary removal of the tube and the assemblies laterally from the elements, said tube and packing-assemblies being endwise reversible for connection to either of said elements.

6. A packing assembly for a hydraulic rotary swivel including non-rotatable and rotatable fluid conducting elements and a tube for conducting fluid between said elements and separable therefrom, comprising: a collar provided with means for demountably attaching the assembly to one of said elements, a packing ring in the collar and contacting the tube, and a packing-retaining gland inwardly of the ends of the collar and abutting one of said elements.

7. A packing assembly for a hydraulic rotary swivel including non-rotatable and rotatable fluid conducting elements and a tube for conducting fluid between said elements and separable therefrom, comprising: a collar provided with means for demountably attaching the assembly to one of said elements, a packing ring in the collar and contacting the tube, a bushing at the outer end of the collar, and a packing-retaining gland inwardly of the ends of the collar.

8. A packing assembly for a hydraulic rotary swivel including non-rotatable and rotatable fluid conducting elements and a tube for conducting fluid between said elements and separable therefrom, comprising: a collar provided with means for demountably attaching the assembly to one of said elements, a plurality of packing rings contacting the tube, a bushing at the outer end of the collar, and a packing-retaining gland inwardly of the ends of the collar for retaining the packing ring.

LESLIE W. STAHL.
HARRY E. YOUNG, Jr.

REFERENCES CITED

The following references are of record in the file of this patent:

UNITED STATES PATENTS

| Number | Name | Date |
|---|---|---|
| 852,580 | Rutherford | May 7, 1907 |
| 1,670,368 | MacPherson | May 22, 1928 |
| 2,227,105 | Pritchard | Dec. 31, 1940 |
| 2,237,715 | Shaw et al. | Apr. 8, 1941 |
| 2,379,035 | Phillips | June 26, 1945 |